Patented Jan. 14, 1941

2,228,742

UNITED STATES PATENT OFFICE 2,228,742

MANUFACTURE OF AMMONIUM SULPHATE

Malcolm Percival Applebey, Norton-on-Tees, England, assignor to Imperial Chemical Industries Limited, a corporation of Great Britain No Drawing. Application November 5, 1937, Serial No. 172,953. In Great Britain November 11, 1936

1 Claim. (Cl. 23—119)

This invention relates to the manufacture of ammonium sulphate, and more particularly to a method of controlling the size and form of ammonium sulphate crystals during manufacture. The invention is applicable to the formation of crystals by the evaporation of ammonium sulphate solutions or by crystallisation from solutions which are maintained substantially supersaturated, e. g. such as are obtained in the so-called saturator process, where ammonia and sulphuric acid are allowed to react in a liquor already saturated with ammonium sulphate.

It is known that the form and size of ammonium sulphate crystals are influenced by the presence of trivalent iron, aluminium or chromium ions in the mother liquor, and that the form and size of the crystals can be controlled by regulating the concentrations of these ions in the mother liquor, due regard being paid to other factors bearing on the crystal shape and form, e. g. the acidity of the liquor. In general it is desirable to keep the concentration of the said ions within certain limits.

Thus if the concentration of the trivalent ions of iron, aluminium or chromium in the mother liquor is allowed to reach an excessive value the crystals are obtained in the form of fine needles which readily break down to dust when dried. For many purposes, however, it is desirable to produce crystals free from dust, and in a form and size such that they do not crumble or cake in transit or storage. These properties are particularly desirable when the ammonium sulphate is to be used as a fertilizer, regularity in crystal size allowing even distribution over the land to be treated.

While the size and form of the ammonium sulphate crystals may be controlled by the presence of trivalent iron, aluminium, and chromium ions in the mother liquor the process is difficult to control particularly as the concentration of these ions tends to build up during the operation of the process.

I have now found that by the addition to the mother liquor of a substance which has the property of combining the trivalent ion of iron, aluminium and chromium to form complex ions, ammonium sulphate crystals can be obtained with different predetermined length and breadth ratios as desired as in this manner I am able effectively to control the concentration of the trivalent iron, aluminium, or chromium ions in a simple and economical manner.

The following examples illustrate but do not limit the invention.

EXAMPLE 1

Thirteen solutions of 176 gms. of ammonium sulphate in 300 mls. of water were made up at a temperature above 60° C., and an amount of ferric ammonium alum added until there was 0.05 part of ferric iron present to every 100 parts of ammonium sulphate. The acidity of the solution was adjusted to 3.5 gms. of $H_2SO_4$ per 100 mls. of solution. To each of 12 of these solutions was added a small portion of a substance which forms complex substances with iron. The substances and their weights are given in the table below.

The solutions were agitated overnight in a slowly cooling thermostat, after which the crystals were separated and examined. The following table gives in the first column the substance added, in the second column the weight of substance added, and in the third column the length to breadth ratio or a description of the crystals formed.

| Substance added | Weight added | Length to breadth ratio of crystals |
|---|---|---|
|  | Grams |  |
| Nil | | At least 10:1. |
| HF | 1.1 | 2½:1. |
| HF | 1.4 | Crystals resembling sugar crystals. |
| $CaF_2$ | 2.0 | A mixed crop of fine needles and needles of 3½:1. |
| KCN | 3.0 | 3:1. |
| KCNS | 3.0 | 3:1. |
| KCNS | 4.0 | A mixed crop of plates and crystals resembling sugar. |
| KI | 20 | 3:1. |
| Glucose | 10 | 4:1. |
| Cane sugar | 4 | 5:1. |
| Oxalic acid | 0.5 | 4:1. |
| Ammonium oxalate | 0.25 | 3:1) With no addition, the solu- |
| Calcium oxalate | 0.25 | 3.5:1} tion gave crystals of 8:1 |
| Sodium oxalate | 0.25 | 3:1) length to breadth ratio. |

EXAMPLE 2

The experiments of Example 1 were repeated using aluminium sulphate in place of ferric ammonium sulphate, there being 0.20 part of Al to 100 parts of ammonium sulphate. The results are given in the following table:

| Substance added | Weight added | Length to breadth ratio of crystals |
|---|---|---|
|  | Grams |  |
| Nil | | At least 10:1. |
| HF | 1.5 | 4:1. |
| KCN | 6 | 3:1. |
| KCN | 8 | 2:1. |
| KCNS | 8 | 6:1, some shorter crystals were formed but on repetition of the experiment none were formed. |
| Oxalic acid | 1 | 4:1. |
| Do | 2 | Crystals resembling sugar crystals. |

EXAMPLE 3

The experiments of Example 1 were repeated using chromium sulphate instead of ferric ammonium sulphate, there being 0.025 part of Cr to 100 parts of ammonium sulphate. The results are given in the following table:

| Substance added | Weight added | Length to breadth ratio of crystals |
|---|---|---|
| | Grams | |
| Nil | | At least 10:1. |
| HF | 0.75 | 4:1. |
| KCN | 6 | 4½:1. |
| KCN | 8 | 2½:1. |
| KCNS | 8 | 2½:1. |
| Oxalic acid | 0.1 | 4:1. |
| Do | 0.15 | 2:1. |

The above experiments were made with the acidity adjusted to that used in normal "saturator" practice. Any difference in acidity or in the quantity of the iron, aluminium or chromium, will result in a change in the optimum amount of added substance required. This is unpredictable and must be established by experiment in each case. The following tables show the effect, on the crystals formed, of varying the ferric ion content, with the acidity, and with the quantity of complex-forming substance used, in this case oxalic acid.

(1) $Fe^{\cdot\cdot\cdot}$ content. 0.029 gms./100 mls. of solution

| $H_2SO_4$ gms./100 mls. | Oxalic acid gms./100 mls. | Crystals produced | Length to breadth ratio |
|---|---|---|---|
| 3.5 | Nil | Fine crystals | 10:1 |
| 3.5 | 0.05 | Small rice crystals | 4:1 |
| 3.5 | 0.067 | Ordinary rice crystals | 3:1 |
| 3.5 | 0.083 | Short rice and sugar | 2:1 |
| 7.0 | Nil | Fine crystals | 9:1 |
| 7.0 | 0.05 | Long needles | 7:1 |
| 7.0 | 0.067 | Ordinary rice | 3:1 |
| 7.0 | 0.083 | Short rice crystals | 2.5:1 |

(2) $Fe^{\cdot\cdot\cdot}$ content. 0.044 gms./100 mls. of solution

| $H_2SO_4$ gms./100 mls. | Oxalic acid gms./100 mls. | Crystals produced | Length to breadth ratio |
|---|---|---|---|
| 3.5 | Nil | Fine dust | 9:1 |
| 3.5 | 0.05 | Small rice crystals | 5:1 |
| 3.5 | 0.083 | Short rice and plates | 2:1 |
| 7.0 | Nil | Fine needles | 10:1 |
| 7.0 | 0.05 | ----do---- | 8:1 |
| 7.0 | 0.083 | Rice crystals | 3:1 |

(3) $Fe^{\cdot\cdot\cdot}$ content. 0.059 gms./100 mls. of solution

| $H_2SO_4$ gms./100 mls. | Oxalic acid gms./100 mls. | Crystals produced | Length to breadth ratio |
|---|---|---|---|
| 3.5 | Nil | No crystals | |
| 3.5 | 0.05 | Fine needles | 7:1 |
| 3.5 | 0.083 | ----do---- | 6:1 |
| 3.5 | 0.10 | ----do---- | 5:1 |
| 7.0 | Nil | No crystals | |
| 7.0 | 0.05 | Fine needles | 8:1 |
| 7.0 | 0.083 | ----do---- | 7:1 |
| 7.0 | 0.10 | ----do---- | 6:1 |

The following two tables show the results of adding oxalic acid and oxalates to a solution containing chromium and aluminum ions.

Chromium—0.025% on salt (added as chromium sulphate)

| Substance added | Weight added | Length to breadth ratio of crystals |
|---|---|---|
| | Grams | |
| None | | 10-12:1 |
| Oxalic acid | 0.25 | 3:1 |
| Ammonium oxalate | 0.25 | 3:1 |
| Sodium oxalate | 0.25 | 3:1 |
| Calcium oxalate | 0.25 | 3:1 |

Aluminum—0.2% on salt (added as aluminum sulphate)

| Substance added | Weight added | Length to breadth ratio of crystals |
|---|---|---|
| | Grams | |
| None | | 7:1 |
| Oxalic acid | 1.5 | 3.5:1 |
| Ammonium oxalate | 1.5 | 4:1 |
| Sodium oxalate | 1.5 | 3:1 |
| Calcium oxalate | 1.5 | 3:1 |
| Oxalic acid | 0.75 | 5:1 |
| Ammonium oxalate | 0.75 | 5:1 |
| Sodium oxalate | 0.75 | 5:1 |
| Calcium oxalate | 0.75 | 6:1 |

The amount of complex forming compound to be added to the solution so as to obtain ammoniumsulphate crystals of any desired length to breadth ratio depends upon the concentration of iron, aluminum or chromium cations in the liquor, and upon other factors such as temperature and acidity, but may be easily determined for any definite set of conditions by a few simple routine trials. In general, the amount of compound added may range from 0.1–12 per cent. by weight of the ammonium sulphate present, but smaller or larger amounts may be added in certain cases. The amount of free acid in the solution may be 3.5–7 grms. per 100 mls. of solution, but higher or lower amounts of acid may be present if desired. For any particular set of conditions, increasing the amounts of the compound or compounds added produces a decrease in the length to breadth ratio of the crystals, and it is even possible, by adding sufficiently large amounts of the compound, to produce crystals of ammonium sulphate which are substantially equidimensional. The reduction in length to breadth ratio of the crystals occurs not only by diminishing the length but also by increasing the breadth whereby the crystals become more robust.

Further complex forming substances which I have found useful for this invention are: Hydrogen iodide, malonic acid, hydrocyanic acids, nitroso-hydrocyanic acid, thiocyanic acid and their derivatives, the polyhydric alcohols, (except glycol), catechol, vanillin, guaiacol, sugars (which can sometimes be used in crude form, such as black treacle), hydrogen sulphide and cresylic acid.

While I have disclosed my invention with reference to certain particular complex forming substances, it is to be understood that my invention is in no respect limited thereto but that any substance having the property of forming complex substances with trivalent iron, aluminum and chromium may be employed. Substances having this property are well-known to those skilled in the art and the complexes so formed are commonly known as Werner complexes. (Ephraim—Inorganic Chemistry—Gurnry & Jackson, London, 1926, English ed.—chapter X, pp. 239-271.)

As has already been pointed out, excessive concentrations of trivalent iron, aluminum, or chromium cations in the mother liquor are deleterious and prevent formation of the desired forms of crystals. The probable effect of adding these complex forming substances is to render the injurious trivalent iron, aluminum, and chromium cation in the mother liquor innocuous by reason of the entry of these cations into the structure of a complex ion.

These complex forming substances, as will be apparent from the foregoing, may differ widely in character and properties. These widely differing properties, however, do not detract from the suitability of these substances for use in the processes of this invention for the reason that the advantages of this invention are obtained by virtue of this common property of forming complex substances with trivalent iron, aluminum, and chromium cations. Consequently, it will be apparent to those skilled in the art that numerous other complex forming substances may be employed with like results.

The complex forming substances useful in processes of this invention may be inorganic or organic substances. Among the inorganic substances I have found hydrofluoric acid, fluorides, hydroiodic acid, iodides, hydrocyanic acid, cyanides, thiocyanic acid and thiocyanates to be particularly effective particularly as these substances are readily available at a low cost and readily form Werner complexes with trivalent iron, aluminum, and chromium without the formation of insoluble residue. Among the organic complex forming substances I prefer to employ sugars, cresylic acid, oxalic acid and soluble oxalates. Substances liberating oxalic acid anions such as oxalic acid and soluble oxalates are particularly suitable for this purpose as they readily form complexes with trivalent iron, aluminum, and chromium without the formation of insoluble residues.

It will be apparent to those skilled in the art that certain of the complex forming substances may be formed in situ in the mother liquor and it is accordingly not contemplated that the benefits of this invention are to be avoided by the addition of a substance normally incapable of forming complex substances with trivalent iron, aluminum, and chromium, but which under the conditions present give rise to the formation of such complex forming substances.

It will also be apparent that sulphur trioxide ammonia, water and similar constituents already present in the mother liquor may enter into the formation of the complexes.

As many apparently widely different embodiments of this invention may be made without departing from the spirit and scope thereof, it is to be understood that I do not limit myself to the specific embodiments set forth and that numerous variations therein may be made within the scope of those skilled in the art.

I claim:

In a process for the manufacture of ammonium sulphate crystals which comprises crystallizing out ammonium sulphate from aqueous solution in the presence of trivalent cations of the class consisting of iron, aluminum and chromium which in excessive concentration tends to cause the formation of crystals having an undesirably great length to breadth ratio, the method of decreasing the concentration of said ions in said solution and thereby controlling the form of the crystals which comprises adding to the solution a substance selected from the class consisting of hydrofluoric acid, fluorides, hydrocyanic acid, cyanides, hydroiodic acid, iodides, thiocyanic acid and thiocyanates.

MALCOLM P. APPLEBEY.